H. E. KINTZ.
SCALE BEAM.
APPLICATION FILED DEC. 29, 1913.
1,094,722.
Patented Apr. 28, 1914.
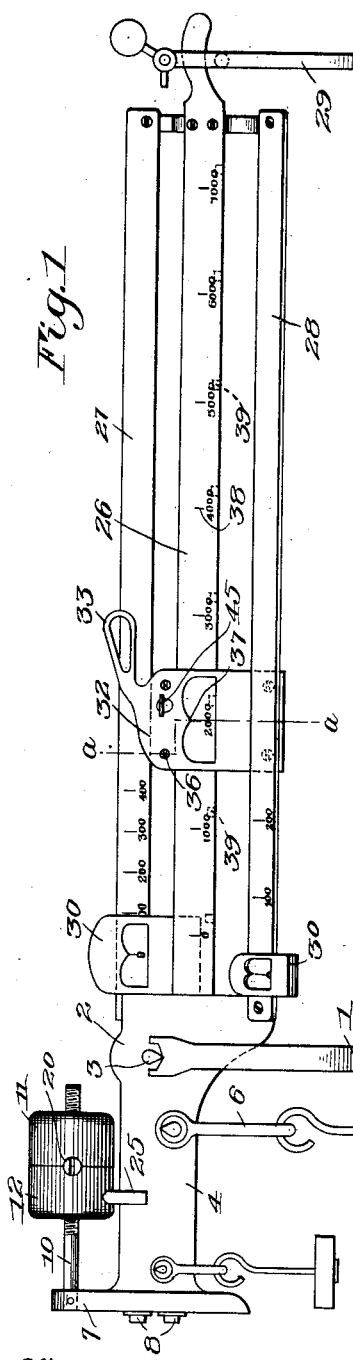
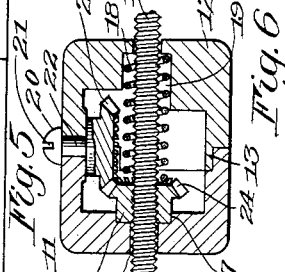
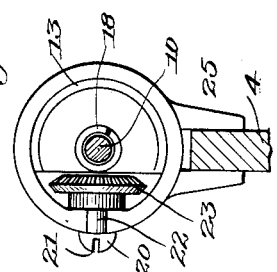
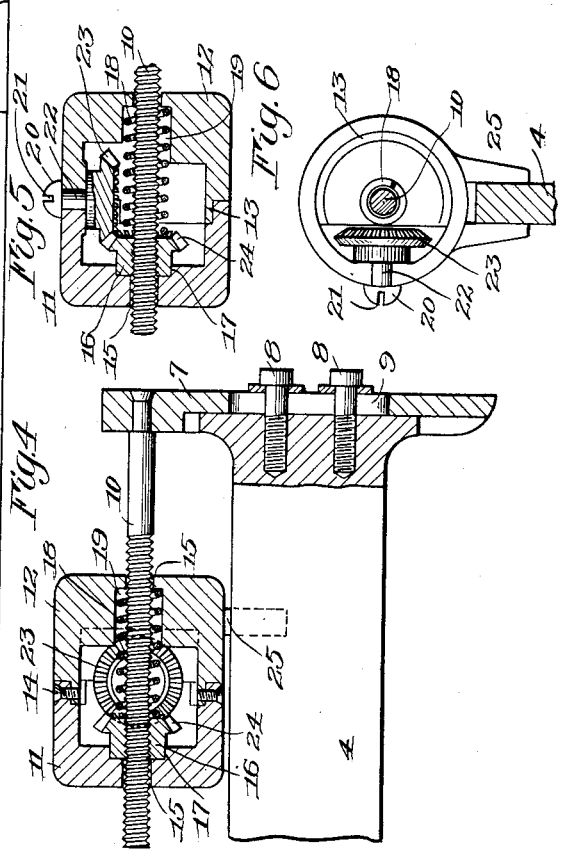
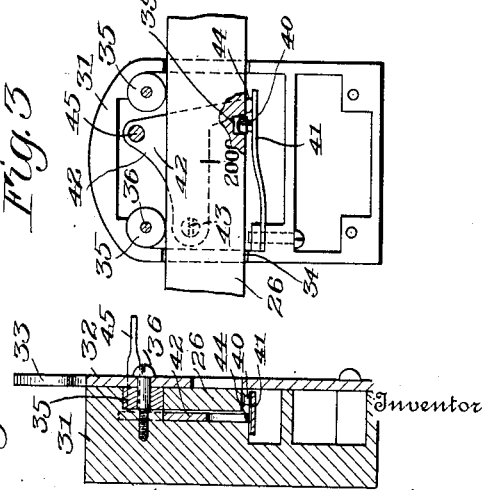

UNITED STATES PATENT OFFICE.

HENRY ELMORE KINTZ, OF ROCHESTER, NEW YORK.

SCALE-BEAM.

1,094,722.  Specification of Letters Patent.  Patented Apr. 28, 1914.

Application filed December 29, 1913. Serial No. 809,222.

*To all whom it may concern:*

Be it known that I, HENRY ELMORE KINTZ, of Rochester, in the county of Monroe and State of New York, have invented a new and useful Improvement in Scale-Beams, which improvement is fully set forth in the following specification and shown in the accompanying drawings.

The present invention relates to scale beams for use with hay, coal and wagon scales and other scales and an object of the invention is to provide an improved balancing ball or member for the scale beam in which the ball and the screw on which it moves are non-rotatable so that there is no danger of the accidental displacement of the ball with relation to the scale beam.

Another object of the invention is to provide an improved beam slide which coöperates with the scale beam in such a manner that all looseness of the slide upon the beam is eliminated while, at the same time, the opposite faces of the beam may be utilized for placing the indicating characters or marks thereon.

To these and other ends the invention consists in certain parts and combinations of parts all of which will be hereinafter described, the novel features being pointed out in the appended claims.

In the drawings: Figure 1 is a side view of a scale beam embodying the present improvements; Fig. 2 is a section on the line *a—a*, Fig. 1, through the improved slide; Fig. 3 is a detail view of the slide with the front plate removed; Fig. 4 is a longitudinal section through the balancing ball; Fig. 5 is a longitudinal section through the ball at right angles to the section shown in Fig. 4; and Fig. 6 shows an interior view of the ball, one of the sections of the latter being removed.

Referring more particularly to the drawings, 1 indicates the chair on which the scale beam 2 is suitably pivoted at 3. On one side of this pivot, the beam is formed with a head 4 to which the platform connecting rod 5 is secured by a coupling member 6. At the outer end of the head 4, a bracket 7 is vertically adjustable by means of bolts 8 and a slot 9. This bracket carries the non-rotating screw 10 which extends parallel with and above the beam head 4, the non-rotating screw serving as a support for the balancing member or ball now to be described.

The balancing member or ball is of hollow construction and divided in a plane transversely of the longitudinal axis of the screw to provide two members 11 and 12, one of which has a flange 13 projecting therefrom to be received within a pocket of the other member, and said other member having screws 14 which coöperate with said flange 13 to hold the two members of the ball together. Opposite walls of the ball are provided with bores or openings 15 through which the screw member 10 extends, and coöperating with the screw member within the ball is a nut 16 which preferably operates within an annular seat 17 about one of the openings 15 and may be held to said seat by a helical spring 18 that surrounds the screw 10 and abuts at one end against a nut 16 and at the other end against a seat 19 on the ball 12. The purpose of this spring is to hold the nut against play upon the screw 10 by shifting said nut into binding engagement with a screw thread on the stem 10.

For operating the nut 16 to shift the latter along the screw 10, an operating member 20 may be employed preferably in the form of a stud or projection on the exterior of the ball, said stud or projection having a slot, groove or other recess for the reception of a screw driver or other instrument through which the operating member may be turned. The operating member preferably turns about an axis extending transversely of the screw 10 and is connected to the nut in such a manner that the rotation of the operating member effects the rotation of the nut. In this instance, the operating member has a bearing portion 22 which has partial bearing in both of the ball members 11 and 12 so that the rotary operating member may be readily connected and disconnected from the ball. The driving connection between the rotary operating member on the exterior of the ball and the nut within the ball may be of any desirable form. In this instance, the operating member carries a crown gear 23 which meshes with a crown gear 24 on the nut 16. It is apparent that instead of this type of gearing, other types may be used such, for instance, as a worm and worm wheel formed respectively on the operating member and the nut. The ball is held against turning by any suitable means, such, for instance, as lugs 25 depending from the member 12 to cooperate with opposite sides of the beam head 4.

Upon that side of the pivot 3 opposite to the beam head 4 are arranged the main beam 26, the tare beam 27 and the third beam 28, there being any number of such beams, depending on the work required. In this instance, the main beam 26 is extended to coöperate with the usual turret 29 while the tare beam 27 and the third beam 28 are provided with slides 30 of any construction.

A slide of novel construction is arranged on the main beam 26. Preferably, it comprises a hollow casing 31 having a removable front plate 32 formed with a hand piece or grip 33, the main beam 26 extending through openings 34 in opposite walls of the casing 31 and being engaged on its upper surface by two rollers 35 which reduce the friction between the slide and the main beam and which turn on the screw fasteners 36 that hold the front plate 32 to casing 31. The front plate 32 is provided with an opening which exposes the front face of the beam and also is provided with an index 37 for coöperation with divisions 38 on the main beam.

For establishing interlocking connection between the slide and the main beam, the latter is provided with cylindrical bores or pockets 39 on the under edge thereof for receiving a locking device carried by the slide. This locking device is preferably in the form of a stud 40 tapering toward its free end in order that it will take up all play as the coöperating parts wear with use. This tapering stud may be carried by a spring arm 41 which is located within the casing 31 below the main beam 26, the normal tendency of such arm being to project the tapering stud 40 in an upward direction. For depressing this arm 41 for the purpose of removing the stud 40 from the openings 39, an operating member is arranged within the casing 31 and is preferably in the form of a lever 42 pivoted at 43 and having a portion 44 slidingly engaging the spring-arm 41 near the free end of the latter. A laterally extending finger piece 45 may project from the operating member 42 through an opening in the front wall 32 of the casing in order that the hand of the user grasping the hand piece 33 may also depress the finger piece 45 for releasing the slide, in order to permit such slide to move back or forth on the main beam to any desired position.

The balancing ball is used for obtaining the proper balance of the scale beam as a whole. Neither the screw rod nor the ball is rotatable, the ball being advanced by a nut operating on the screw and connected to the ball. This nut is housed and is operated by a member turning about an axis extending transversely of the length of the screw rod, this member being preferably operable only by a tool. With this arrangement, it is impossible for the balancing ball to have its position accidentally disturbed by one carelessly handling or manipulating such ball. The operating member can only be turned by an instrument, and, in turning the member, it is unnecessary to remove the instrument from the operating member so that the movement of the ball may be effected quicker.

The beam slide is supported on rollers which turn on screws that secure the front or face plate that is secured to the main casing to the slide. The openings in the beam for engagement by the locking device are provided on the under side of the beam where they are not liable to collect dirt or moisture, and the opposite sides of the beam are left free for numbers or scale marks. The locking device is in the form of a tapered plug that takes up all play or looseness as the parts wear, and it is operated through connections from a point in proximity to the hand piece or grip of the slide, the hand piece being above the scale beam while the locking device is below the scale beam.

What I claim as my invention and desire to secure by Letters Patent is:

1. In combination with a scale beam, a balancing ball therefor held against turning relatively to the beam, a screw member also held against turning relatively to the beam, a nut operating on a screw member and connected to the ball to cause the latter to move with such nut longitudinally of the screw member, and an operating member for the nut adapted to turn about an axis extending transversely of the screw member.

2. In combination with a scale beam, a balancing ball for such beam held against turning relatively to the beam, a screw member held against turning relatively to the beam, a nut housed within the balancing ball, and operating on the screw member, and an operating member arranged on the exterior of the balancing ball and geared to the nut for moving the latter and the ball longitudinally of the screw member.

3. In combination with a scale beam, a balancing ball for such beam held against turning relatively to the beam, a screw member also held against turning relatively to the beam, a nut operating on the screw member and connected to the ball to cause the latter to move with the nut longitudinally of the screw member, a beveled gear on said nut, and an operating member having a beveled gear connected thereto and meshing with the beveled gear on the nut.

4. In combination with a scale beam, a balancing ball for such beam held against turning relatively to the beam, a screw member held against turning relatively to the beam, a nut operating on the screw member and connected to the ball to cause the latter to move with such nut longitudinally of the screw member, and a spring interposed between the ball and the nut to cause such nut to bind against the screw member.

5. In combination with a scale beam, a screw member held against turning relatively to the beam, a hollow balancing ball surrounding such screw member, held against turning relatively to said screw member and divided in a plane transverse of the longitudinal axis of the screw member, a nut arranged within the ball and turning on the screw member, and operating means for the nut having a portion on the exterior of the ball.

6. In combination with a scale beam, a screw member held against turning relatively to the beam, a hollow balancing ball surrounding such screw member, held against turning relatively to said screw member and divided in a plane transverse of the longitudinal axis of the screw member, a nut arranged within the ball, seated against one wall thereof and turning on the screw member, a coiled spring surrounding the screw member abutting the opposite wall of the ball and also abutting the nut, and means operable from the exterior of the casing for turning the nut.

7. In combination with a scale beam, a balancing ball for such beam, held against turning relatively to the beam, a screw member held against turning relatively to the beam, a nut operating on the screw member and connected to the ball to cause the latter to move with such nut longitudinally of the screw member, and an operating member for the nut arranged on one side of the ball.

8. In combination with a scale beam, a beam slide, and a locking device carried by the slide for coöperating with the under edge of the scale beam, a grip carried by the slide above the scale beam, and a finger piece arranged on the slide above the scale beam and operatively connected to the locking device.

9. In combination with a scale beam, a beam slide, a spring arm carried by the slide and having a portion adapted to coöperate with the under side of the scale beam, a pivoted member arranged on the slide in rear of the scale beam adapted to coöperate with the spring arm near the free end of the latter, and a finger piece operable from the exterior of the slide and connected to the pivoted member so that the latter may be moved to disengage the portion on the spring arm from the scale beam.

10. In combination with a scale beam having its under edge provided with cylindrical bores, a beam slide, a grip arranged on the slide above the scale beam, a spring arm arranged within the slide and having a tapering projection near its free end for coöperation with the cylindrical bores of the scale beam, a pivoted member mounted on the slide in rear of the scale beam and having a portion coöperating with the free end of the spring arm, and a finger piece extending to the exterior of the casing above the scale beam.

HENRY ELMORE KINTZ.

Witnesses:
 HAROLD H. SIMMS,
 ADA M. WHITMORE.

---

Copies of this patent may be obtained for five cents each, by addressing the "Commissioner of Patents, Washington, D. C."